(12) United States Patent
Imanishi et al.

(10) Patent No.: US 12,287,998 B2
(45) Date of Patent: Apr. 29, 2025

(54) INFORMATION PROCESSING SYSTEM, DISPLAY DEVICE, AND CONTROL METHOD

(71) Applicant: Lenovo (Singapore) Pte. Ltd., Singapore (SG)

(72) Inventors: Yoshimitsu Imanishi, Kyoto (JP); Seiichi Kawano, Kanagawa (JP); Mitsuhiro Yamazaki, Kanagawa (JP); Yoshitsugu Suzuki, Kanagawa (JP); Kazunori Yamamura, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 18/622,338

(22) Filed: Mar. 29, 2024

(65) Prior Publication Data
US 2024/0378006 A1 Nov. 14, 2024

(30) Foreign Application Priority Data
May 12, 2023 (JP) ................................. 2023-079395

(51) Int. Cl.
*G09G 5/00* (2006.01)
*G06F 3/04812* (2022.01)
*G06F 3/14* (2006.01)
*G06T 11/20* (2006.01)

(52) U.S. Cl.
CPC ............ *G06F 3/14* (2013.01); *G06F 3/04812* (2013.01); *G06T 11/203* (2013.01)

(58) Field of Classification Search
CPC ......... G06F 3/04812; G06F 3/14; G09G 5/08; G06T 11/20; G06T 11/203
See application file for complete search history.

(56) References Cited

U.S. PATENT DOCUMENTS

| | | | | |
|---|---|---|---|---|
| 8,914,305 | B2 * | 12/2014 | Buck | G06F 3/04812 705/37 |
| 9,710,049 | B2 * | 7/2017 | Takashimizu | G09G 5/14 |
| 9,785,305 | B2 * | 10/2017 | Alonso Ruiz | G06F 3/0412 |
| 9,870,117 | B2 * | 1/2018 | Ohba | G06F 3/0481 |
| 2007/0067744 | A1 * | 3/2007 | Lane | G06F 3/04842 715/861 |
| 2007/0273658 | A1 * | 11/2007 | Yli-Nokari | G06F 3/03547 345/173 |

(Continued)

FOREIGN PATENT DOCUMENTS

| | | |
|---|---|---|
| CN | 106201411 A | 12/2016 |
| CN | 106383678 A | 2/2017 |

(Continued)

*Primary Examiner* — Joe H Cheng
(74) *Attorney, Agent, or Firm* — Osha Bergman Watanabe & Burton LLP (57) ABSTRACT

An information processing system includes a host system that samples coordinates indicated by using an input device to acquire a background image, and a controller that displays an output image based on the background image on a display medium. The host system notifies the controller of the coordinates. The controller updates the background image with an update cycle longer than a sampling cycle of the coordinates, and outputs the output image with a cursor placed at the coordinates on the background image to the display medium.

10 Claims, 6 Drawing Sheets

(56) References Cited

U.S. PATENT DOCUMENTS

| | | | | |
|---|---|---|---|---|
| 2010/0046830 A1* | 2/2010 | Wang | ........................ | G06T 7/12 |
| | | | | 382/164 |
| 2011/0063210 A1* | 3/2011 | Yamada | ................. | G09G 3/344 |
| | | | | 345/157 |
| 2012/0114253 A1* | 5/2012 | Nakajima | ............ | G06V 10/422 |
| | | | | 382/201 |
| 2012/0262371 A1* | 10/2012 | Lee | .................... | H04N 21/4432 |
| | | | | 345/157 |
| 2014/0365931 A1* | 12/2014 | Yoshimura | .......... | G06F 3/04842 |
| | | | | 715/767 |

FOREIGN PATENT DOCUMENTS

| | | |
|---|---|---|
| CN | 206147586 U | 5/2017 |
| CN | 206470737 U | 9/2017 |
| JP | 2011065422 A | 3/2011 |
| JP | 2015064421 A | 4/2015 |
| JP | 2015092342 A | 5/2015 |
| JP | 2020038688 A | 3/2020 |

\* cited by examiner

INFORMATION PROCESSING SYSTEM, DISPLAY DEVICE, AND CONTROL METHOD

CROSS-REFERENCE TO RELATED APPLICATIONS

This application claims priority to Japanese Patent Application No. 2023-079395 filed on May 12, 2023, the contents of which are hereby incorporated herein by reference in their entirety.

BACKGROUND

Technical Field

This application relates to an information processing system, a display device, and a control method such as, for example, the display of a cursor for input operations.

Description of the Related Art

Some information processing devices are each equipped with an electro-phoretic display (EPD). Japanese Unexamined Patent Application Publication No. 2015-64421 describes that power consumption is able to be reduced by employing an EPD in an information processing device. The EPD, however, requires a long time to refresh the screen. The refresh rate of an EPD is usually about 8 Hz, while the refresh rate of a liquid crystal display (LCD) or an organic light emitting diode (OLED) display is 60 Hz or higher.

In addition, in a user interface provided by an operating system (OS), input operations by indirect and relative pointing are used. The indirect and relative pointing is a function of displaying a cursor at the coordinates on the screen corresponding to a position indicated by an input device, rather than directly specifying the position indicated by the input device, and specifying the coordinates of the displayed cursor in response to the input operation. The indirect and relative pointing is mainly applied when a pointing device such as a mouse is used as an input device.

The indirect and relative pointing is able to be regarded as a feedback system that includes user actions. Specifically, the user operates an input device while following the motion of a cursor on a screen, and the system changes the position where the cursor appears in response to the operation. In such a situation, the user (1) finds the cursor on the screen, (2) moves the cursor by operating the input device, and (3) places the cursor on a target (operation target) and performs operations such as clicking. In information processing devices that employ EPDs, the display of the cursor at the position indicated by the operation is delayed, which often makes the operation difficult.

Figure 6:
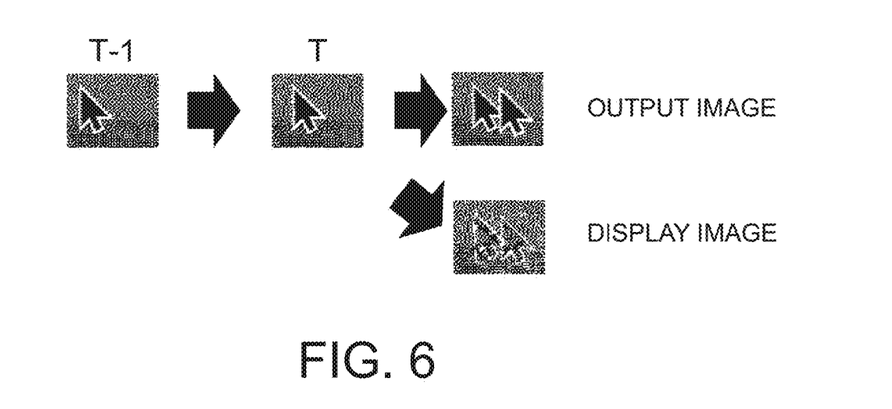
FIG. 6 is an explanatory diagram illustrating an example of an output image including a cursor and a display image.

When the indicated position is moved, a plurality of cursors is discretely displayed at different positions (see FIG. 6). Therefore, the user may not be able to recognize the cursor that should be displayed at the position that is the operation target and may lose it. Moreover, even if the user successfully recognizes the cursor, the operation may be disturbed. One of the causes is a comparatively large delay in luminance changes of pixels. For example, it takes more than 100 ms for black-and-white reversal. When the luminance is restored for a pixel with the luminance inversion indicated once, it is necessary to wait until the previous luminance change is completed. In addition, in the process of drawing with a cursor that sequentially moves, the instance of starting the drawing process at the latest position is repeated after the end of the drawing process of the cursor at a certain position.

Figure 7:
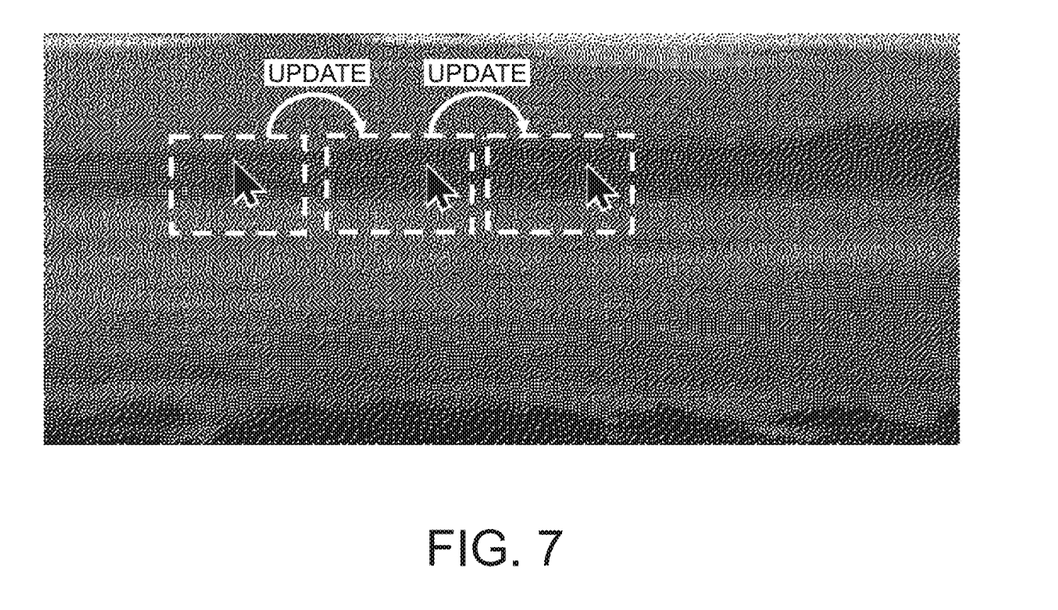
FIG. 7 is an explanatory diagram for describing another comparative example of the cursor display processing.

Therefore, instead of performing the drawing process on the entire screen including the cursor, the image may be updated only in the rectangular area around the cursor. In this method, a new rectangular area is determined in a stage at which the new rectangular area no longer overlaps with the rectangular area including the cursor that was displayed at the last minute due to the shift of the indicated position, and the cursor is displayed within the determined rectangular area (see FIG. 7). Since the overlap of the rectangular area to be updated is avoided, the individual cursors are separated. Another possibility is to reduce the size of the rectangle area to increase the drawing frequency to reduce the distance between a plurality of cursors that appear intermittently. It is, however, still difficult to represent a smooth cursor behavior in some cases.

SUMMARY

An information processing system according to one or more embodiments of the present application includes: a host system that samples the coordinates indicated by using an input device to acquire a background image; and a controller that displays an output image based on the background image on a display medium, wherein the host system notifies the controller of the coordinates, and the controller updates the background image with an update cycle longer than a sampling cycle of the coordinates, and outputs the output image with the cursor placed at the coordinates on the background image to the display medium.

In the information processing system described above, the host system may output a drawing command indicating the coordinates and the cursor to the controller, and the controller may place the cursor at the coordinates indicated by the drawing command.

In the information processing system described above, the controller may place the cursor at the latest coordinates when the display area of the cursor based on the latest coordinates does not include the display area of the cursor whose elapsed time from the placement time point is within the update cycle.

In the information processing system described above, the controller may update the background image to be the output image to the latest background image when there is no cursor whose elapsed time from the placement time point is within the update cycle.

In the information processing system described above, the controller may erase the cursor placed in the display area that does not include the display area of the cursor based on the latest coordinates when the elapsed time of the cursor from the placement time point is equal to or longer than the update cycle.

In the information processing system described above, the controller may extract a partial image that has a size containing the cursor at the coordinates from the last-updated background image, superimpose the cursor on the partial image to form a cursor icon, and place the cursor icon at the coordinates.

In the information processing system described above, the host system may predict predicted coordinates after a predetermined elapsed time from the present based on at least two samples of coordinates, and the controller may place the cursor at the predicted coordinates on the background image.

A display device according to one or more embodiments of the present application includes a controller that displays an output image based on a background image on a display medium, wherein the controller may update the background image with an update cycle longer than a sampling cycle of coordinates and may output the output image with a cursor placed at the coordinates to the display medium.

A control method according to one or more embodiments of the present application is a control method in an information processing system with a host system and a controller, wherein the host system samples coordinates indicated by using an input device, notifies the controller of the coordinates, and acquires a background image, and wherein the controller updates the background image with an update cycle longer than the sampling cycle of the coordinates, and outputs an output image with a cursor placed at the coordinates to a display medium.

According to one or more embodiments of the present application, a user is enabled to easily identify a cursor for an operation.

DETAILED DESCRIPTION

Figure 1:
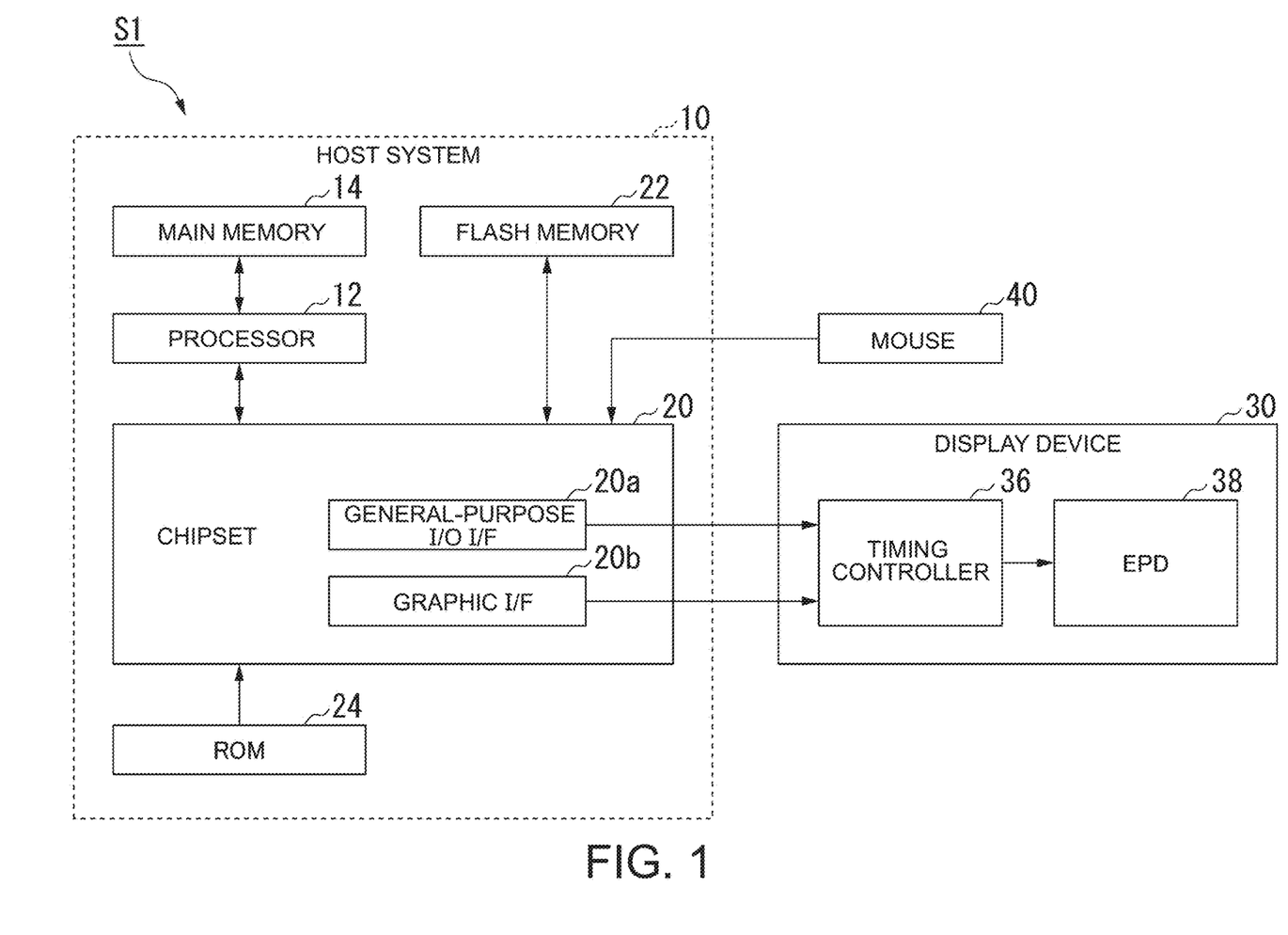
FIG. 1 is a schematic block diagram illustrating an example of a functional configuration of an information processing system according to one or more embodiments.

The embodiments of the present application are described below with reference to the drawings. First, there is described an example configuration of an information processing system S1 according to one or more embodiments of the present application. FIG. 1 is a schematic block diagram illustrating an example of the functional configuration of the information processing system S1 according to one or more embodiments.

The information processing system S1 has a host system 10 and a display device 30. The host system 10 and the display device 30 are connected to each other so as to be able to send and receive various kinds of data. A mouse 40 is an example of an input device, and is connected to the host system 10 by wired or wireless communication.

The host system 10 receives an input signal from the mouse 40. The host system 10 samples the coordinates indicated by the input signal from the mouse 40 at each predetermined sampling cycle. The sampled coordinates indicate the relative position with reference to a predetermined reference point (for example, the origin, the center of gravity, or the like) within the display screen of the display device 30.

The host system 10 executes various programs to acquire a background image. The background image is mainly a moving image. The background image is updated at each frame cycle. Whenever the background image is updated, the host system 10 outputs display data representing the updated background image to the display device 30. The host system 10 outputs the coordinate information indicating the sampled coordinates to the display device 30.

The display device 30 has a timing controller 36 and an EPD 38.

The timing controller 36 causes the EPD 38 to display an output image based on the background image represented by the display data input from the host system 10.

The timing controller 36 is an example of a controller that causes the EPD 38 to display an output image containing the latest background image at each predetermined update cycle. The update cycle refers to the cycle of updating the output image or the background image employed as an element of the output image, and corresponds to the reciprocal of the refresh rate of the EPD 38. The update cycle is longer than a sampling cycle of the coordinates. The timing controller 36 forms the output image by placing (writing) the cursor at the coordinates indicated by the coordinate information on (over) the background image to be displayed on the EPD 38, and displays the formed output image on the EPD 38.

The information processing system S1 may be configured as a single information processing device, or the information processing device with the host system 10 and the display device 30 may be separate units. These information processing devices may be implemented as a personal computer, a tablet terminal, a cell phone, or any other form.

In this application, a processor or any other hardware performing a process directed by a command described in various programs is sometimes referred to as "executing a program," "execution of a program," or the like.

In this application, "image" is not necessarily limited to a spatial distribution of shading or color, but refers to information able to be seen, in other words, text, symbols, figures, patterns, or any combination thereof. The term "background image" refers to an image on which the cursor is placed, and is not necessarily limited to an image that represents only the "background." Background images include so-called desktop images, various execution images displayed by executing application programs (sometimes referred to as "app" in the present application), and the like.

The input device is not necessarily limited to the mouse 40. The input device may be any pointing device capable of detecting positional information for defining the position of the cursor displayed on the display screen of the display device 30. The input device may be, for example, a joystick, a trackball, and so on.

In the following description, there is mainly assumed a case in which the input device is the mouse 40 and the information processing system S1 is configured as a single information processing device.

Figure 2:
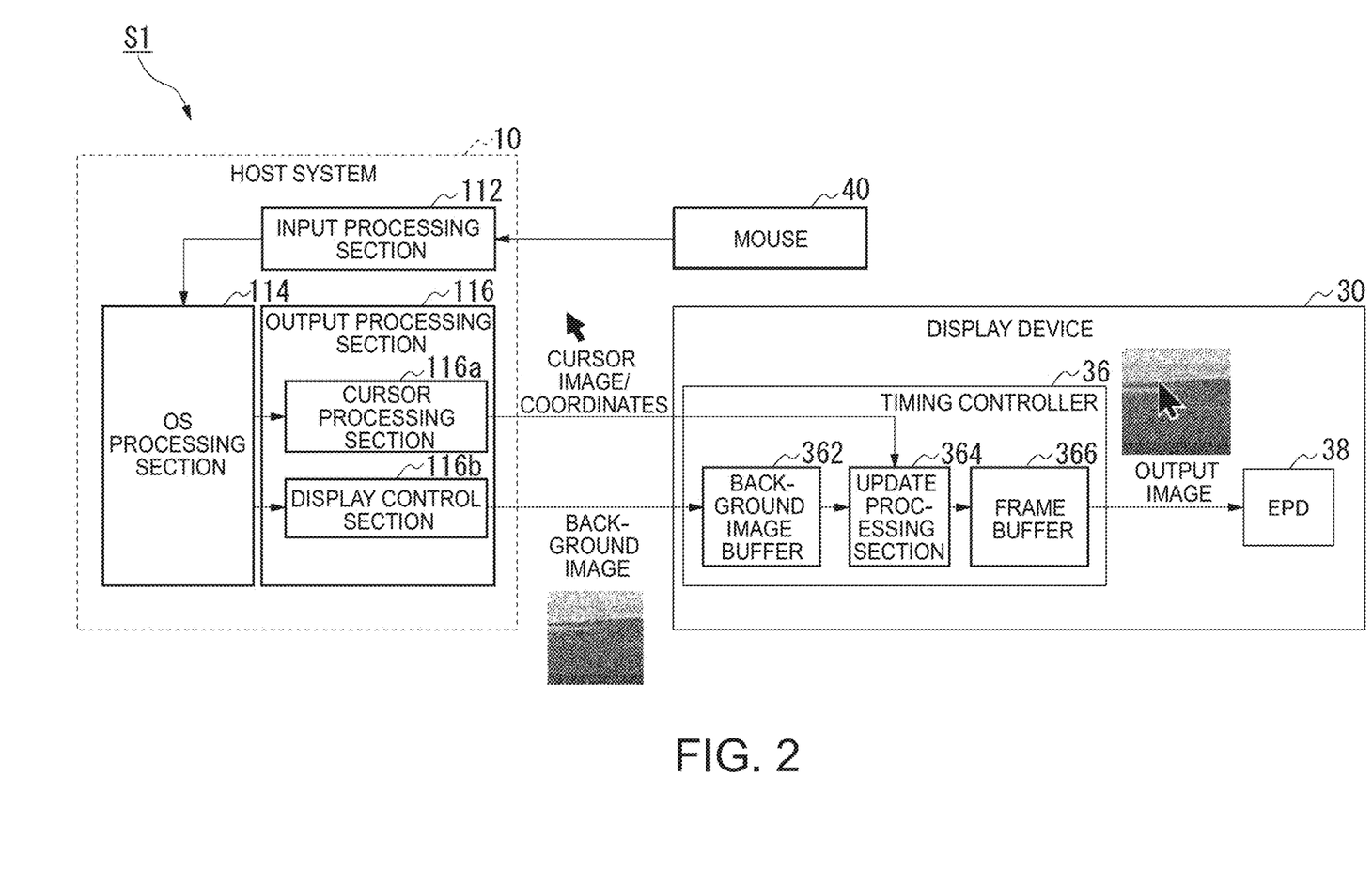
FIG. 2 is a schematic block diagram illustrating an example of a functional configuration of the information processing system according to one or more embodiments.

Subsequently, description is made on an example of the hardware configuration of the information processing system S1. FIG. 2 is a schematic block diagram illustrating an example of the hardware configuration of the information processing system S1 according to one or more embodiments. The host system 10 includes a processor 12, a main memory 14, a chipset 20, and a flash memory 22.

The processor 12 controls the functions of the entire information processing device having the host system 10. The processor 12 is, for example, one or more central processing units (CPUs). The processor 12 executes a predetermined program and cooperates with the main memory 14 and other hardware to perform the functions of the host system 10.

The main memory 14 is a writable memory used as a work area of the processor 12, in other words, an area for reading programs to be executed, various setting data, and an area for writing processing data acquired by executing programs. The main memory 14 includes, for example, a plurality of dynamic random access memory (DRAM) chips. The executable programs include an operating system, various device drivers for controlling peripherals or the like, various services/utilities, apps, and so on.

The processor 12 and the main memory 14 function as a system device that form a core computer system of the information processing device, that is, the host system 10. The host system 10 includes the system device as hardware and software such as an operating system, scheduling tasks, and the like.

The chipset 20 includes one or more controllers and an input/output interface (I/F) that enables connection to a plurality of devices for input or output of various data. The chipset 20 is connected to the processor 12, the flash memory 22, the display device 30, and the mouse 40 so as to be capable of input or output of various data. For example, the IEEE 802.15.1 standard may be used for the connection with the mouse 40.

The chipset 20 includes a general-purpose input/output I/F 20a and a graphic I/F 20b. The general-purpose input/output I/F 20a is mainly used for outputting coordinate information, which indicates sampled coordinates, to the display device 30. The general-purpose input/output I/F 20a, for example, outputs coordinate information according to the universal serial bus (USB) standard.

The graphic I/F 20b is mainly used to output display data indicating a background image to the display device 30. The graphic I/F 20b outputs display data, for example, according to any one of the USB standard, the mobile industry processor interface (MIPI) standard, and the like.

The flash memory 22 stores various programs and data. The programs include, for example, firmware, device drivers, services/utilities, apps, and so on. These programs are executed by the processor 12. The stored data includes data to be processed by the processor 12 and data generated by processing. The generated data may include final data as well as intermediate data that are generated before a certain processing step and used in subsequent processing steps.

The display device 30 has a timing controller (T-CON) 36 and the EPD 38.

The timing controller 36 executes predetermined firmware to control the functions of the display device 30. The timing controller 36 receives inputs of display data and coordinate information from the host system 10. The timing controller 36 forms an output image by placing the cursor at the coordinates indicated by the coordinate information on the background image represented by the display data. The timing controller 36 displays the formed output image on the EPD 38.

The timing controller 36 specifies the signal value of each pixel constituting the output image at a predetermined refresh rate, and generates an output signal to indicate the timing of displaying the output image with the density corresponding to the specified signal value. Refresh processing is performed on the EPD 38 at each refresh cycle. The timing controller 36 outputs the generated output signals to the driving circuit of the EPD 38. The driving circuit has, for example, a transistor-transistor logic (TTL) circuit.

The EPD 38 has a shape whose thickness is much thinner than its height and width, and a screen area is provided on its surface. In the screen area, a plurality of pixels are arranged two-dimensionally at regular intervals. Each pixel has an electro-phoretic element and a pixel electrode. The EPD 38 has a driving circuit. The driving circuit applies a drive voltage corresponding to the signal value indicated for each pixel from the timing controller 36 to the pixel electrode of the pixel concerned. The electro-phoretic element is displayed with the brightness corresponding to the drive voltage. The brightness distribution of each pixel in the screen area represents the display image.

The background image may be a monochrome binary image or a grayscale image. The binary image has two values of the per-pixel signal. The two values are associated with lightness and darkness (black and white), respectively. The grayscale image has three or more values of the per-pixel signal (grayscale value), indicating the degree of brightness of the image. The background image may be a color image. The color image is represented by color signal values such as, for example, RGB signal values, which indicate the brightness of colors able to be emitted by each pixel.

In the case where display data representing a grayscale image is input to the timing controller 36, the grayscale values for respective pixels may be dithered and converted into a binary image, and the resulting binary image may be used as an output image. Dithering is an example of binarization. Dithering includes the following steps: (i) setting a grayscale value as a determination threshold; (ii) generating a random number that has the same value range as the grayscale value and whose probability of occurrence is uniform within the value range (uniform random number); (iii) setting the value of the binary information as 1 in the case where the generated random number is equal to or greater than the determination threshold, and setting the value of the binary information as 0 in the case where the generated random number is less than the determination threshold. When the value of the binary information is set to 1, the pixel is to be displayed in white as a bright area. When the value of the binary information is set to 0, the pixel is to be displayed in black as a dark area.

In the case where display data representing a color image is input to the timing controller 36, a known grayscale conversion is performed on the color signal value for each pixel, and grayscale conversion, which allows conversion to grayscale values, includes the process of calculating the weighted average of the color signal values for each color as a grayscale value. The grayscale conversion converts a color image into a monochrome grayscale image with pixel-by-pixel intensity distribution. The converted grayscale image may be binarized and converted to a binary image.

The following describes an example of the functional configuration of the information processing system S1 according to one or more embodiments. FIG. 2 is a schematic block diagram illustrating an example of the functional configuration of the information processing system S1 according to one or more embodiments. An example of the functional configuration of the host system 10 is described below. The host system 10 has an input processing section 112, an OS processing section 114, and an output processing section 116.

The input processing section 112 receives input signals from the mouse 40 and samples the relative positions indicated by the input signals at each predetermined sampling cycle. The sampling cycle is, for example, 8 to 30 ms (corresponding to a sampling frequency of 160 Hz to 30 Hz).

The sampling cycle of the relative position and thus of the coordinates is usually equivalent to the frame cycle of the background image and shorter than the update cycle. The relative position corresponds to the displacement from the reference point in the screen space. As the reference point, a point (for example, the origin) in the screen area of the EPD 38, which is set as a standard output from the host system 10, is used. The input processing section 112 outputs the coordinate information indicating the coordinates of each sampled sample to the OS processing section 114. The function of the input processing section 112 is implemented by the CPU 12 running a dedicated device driver on the OS.

In the OS processing section 114, the processor 12 executes the kernel, which is the core of the OS, and provides the basic functions of the OS. The basic functions of the OS processing section 114 include the control of the execution states of apps, firmware, device drivers, and other programs by the host system 10, and the control of the allocation of computing resources (resources) of the host system 10.

The host system 10 executes various programs under the control of the OS processing section 114 (sometimes referred to as "on the OS" in the present application). By executing the programs, the background images are acquired. The acquisition of a background image may be any of the following functions: generating a background image, receiving a background image input from another device, and reading out display data indicating a background image previously stored in a storage medium of the local system. The applicable function may depend on the program to be executed.

The OS processing section 114 outputs the display data indicating the acquired background image to the display device 30 via the output processing section 116. The frame cycle of the background image may be equivalent to the sampling cycle of the coordinates (for example, 8 to 30 ms [corresponding to a frame rate of 160 Hz to 30 Hz]).

The OS processing section 114 outputs the coordinate information input from the input processing section 112 to the display device 30 via the output processing section 116. The OS processing section 114 sometimes uses the input coordinate information in the processing under the execution of the program. The OS processing section 114 may cause a change in the background image on the basis of the coordinate information.

In addition, the OS processing section 114 may call one or both of the functions of the input processing section 112 and the output processing section 116 when outputting display data according to the running program.

Each of the functions of the input processing section 112 and the output processing section 116 may be described as an application programming function (API).

The output processing section 116 has a cursor processing section 116a and a display control section 116b. The cursor processing section 116a outputs the coordinate information input from the OS processing section 114 to the display device 30. The cursor processing section 116a may be preconfigured with an image of a cursor and generate a drawing command that indicates the acquired coordinate information and the cursor. The drawing command is a command to instruct the display device 30 to display the cursor at the coordinates indicated by the coordinate information. The cursor processing section 116a outputs the generated drawing command to the display device 30. The function of the cursor processing section 116a may be implemented by the processor 12 running a cursor drawing app on the OS and cooperating with the general-purpose input/output I/F 20a. The cursor drawing app is formed as the above API function and may be called by other programs.

The display control section 116b outputs the display data input from the OS processing section 114 to the display device 30. The functions of the display control section 116b may be implemented by the processor 12 running a device driver for the display device 30 on the OS and cooperating with the graphic I/F 20b. The device driver may be configured as the API functions described above.

The following describes an example of the functional configuration of the timing controller 36. The timing controller 36 has a background image buffer 362, an update processing section 364, and a frame buffer 366. The timing controller 36 executes predetermined firmware to implement the function thereof.

The background image buffer 362 stores the display data input from the host system 10. The stored display data in the background image buffer 362 is updated (overwritten) with the input display data each time the display data is input. The background image buffer 362 stores the display data indicating the latest background image at that time.

The update processing section 364 performs processing related to updating the background image and cursor displayed on the EPD 38. When no coordinate information is input from the host system 10, the update processing section 364 writes the background image stored in the background image buffer 362 to the frame buffer 366 at each update cycle. The frame buffer 366 saves the output image to be displayed on the EPD 38. Therefore, in the case where the cursor is not displayed, the frame buffer 366 is able to display a new background image on the EPD 38 at each update cycle. Note that the background image buffer 362 may retain the background image used for updating by writing to the frame buffer 366 at least until the next update.

When the coordinate information to be updated is input from the host system 10, the update processing section 364 places the cursor at the coordinates indicated by the coordinate information in the output image stored in the frame buffer 366. Therefore, the cursor is superimposed (written over, overlayed) on the display area with the coordinates as the reference point. The reference point only needs to be a position representative of the cursor position, such as the origin or the center of gravity. In the case where coordinate information is input as part of a drawing command, the update processing section 364 may place the cursor transmitted by the drawing command instead of the cursor set in advance in its own section.

Since the coordinate information is updated at each sampling cycle, the update processing section 364 also performs the process of placing the cursor on the basis of the updated coordinate information at each sampling cycle. Specifically, the cursor position displayed on the screen area of the EPD 38 is updated at each sampling cycle. The update cycle of the EPD 38 is longer than the response time of the EPD 38 and may be more than twice as long as the sampling cycle. Therefore, a plurality of cursors may appear in the display image from the EPD 38. In the case where the moving speed of the coordinates is low, simply displaying a cursor at each update cycle may cause an overlapping area where the display area of the cursor at a certain time point overlaps a part of the display area of the cursor at the next sampling cycle. Therefore, individual cursors may not be distinguished and visibility may be disturbed.

Therefore, when the display area does not include part or all of any of the display areas of cursors whose elapsed time from the time point of placement of a display area based on the latest updated coordinates (sometimes referred to as "placement time point" in the present application) is within the update cycle, the update processing unit 364 places the cursor at the latest updated coordinates. Since cursors in different positions are displayed without overlapping each other, visibility is not disturbed.

According to the configuration in FIG. 2, the update of the coordinate information is concurrent with the update of the background image stored in the background image buffer 362. The update processing section 364 gives priority to updating the cursor position over updating the background image. Specifically, when a cursor whose elapsed time from the placement time point is within the update cycle is present in the screen area, the update processing section 364 does not update the background image, which is an output image at that time, to the latest image, but maintains the background image. In this case, the update processing section 364 does not write the background image stored in the background image buffer 362 to the frame buffer 366.

In the case where no cursor whose elapsed time from the placement time point is within the update cycle is present in the screen area, the update processing section 364 updates the background image, which is an output image at that point, to the latest image. Such cases include when the coordinates indicated by the input coordinate information remain unchanged for a period equal to or longer than the update cycle, when the coordinate information indicating valid coordinates is not input continuously for a period of time equal to or longer than the update cycle, or the like. At this time, the update processing section 364 does not write the background image stored in the background image buffer 362 to the frame buffer 366. By prioritizing the placement of the cursor based on the coordinates after updating over updating the background image, generation of cursors that cause afterimages is able to be avoided, thereby reducing the subjective degradation of image quality.

The update processing section 364 may generate a cursor icon. When generating the cursor icon, the update processing section 364 extracts an image within the partial area (sometimes referred to as "partial image" in the present application) that has the coordinates indicated by the coordinate information as the reference point, from the background image used for the last update stored in the background image buffer 362. The update processing section 364 then superimposes the cursor on the extracted partial image. Preferably, the partial area has a predetermined shape (for example, a rectangle or a square) and is as small as possible to encompass the entire cursor. The partial area only needs to, for example, have a size that is inscribed on the outer edge or the constant-width perimeter of the cursor. The update processing section 364 is also able to use the generated cursor icon, as an example of a cursor, as a target of processing such as placing, erasing, or updating in position in the information processing system S1.

The update processing section 364 may erase a cursor placed in a display area that does not overlap with part or all of the display area of the cursor whose elapsed time from the placement time point is equal to or more than the update cycle and that is based on the latest coordinates. For example, the update processing section 364 identifies a cursor whose elapsed time from the placement time point is equal to or more than the update cycle. The update processing section 364 extracts a partial image that has the same display area as the identified cursor from the background image used for the last update, which is stored in the background image buffer 362. Then, the update processing section 364 places the extracted partial image in the display area of the identified cursor. This replaces the displayed cursor with a partial image that is part of the latest background image.

The frame buffer 366 saves an output image to be output to the EPD 38. The frame buffer 366 has a storage area corresponding to the screen area of the EPD 38 by having a storage medium that stores the signal value of each pixel representing the output image. The timing controller 36 has an output signal generation circuit (not illustrated) that generates an output signal representing the output image for each update cycle using the per-pixel signal values stored in the frame buffer 366. The output signal generation circuit outputs the generated output signal to the driving circuit of the EPD 38.

In one or more embodiments, the background image, the background image with a superimposed cursor, and the background image with a further superimposed partial image may be the output images.

Figure 3:
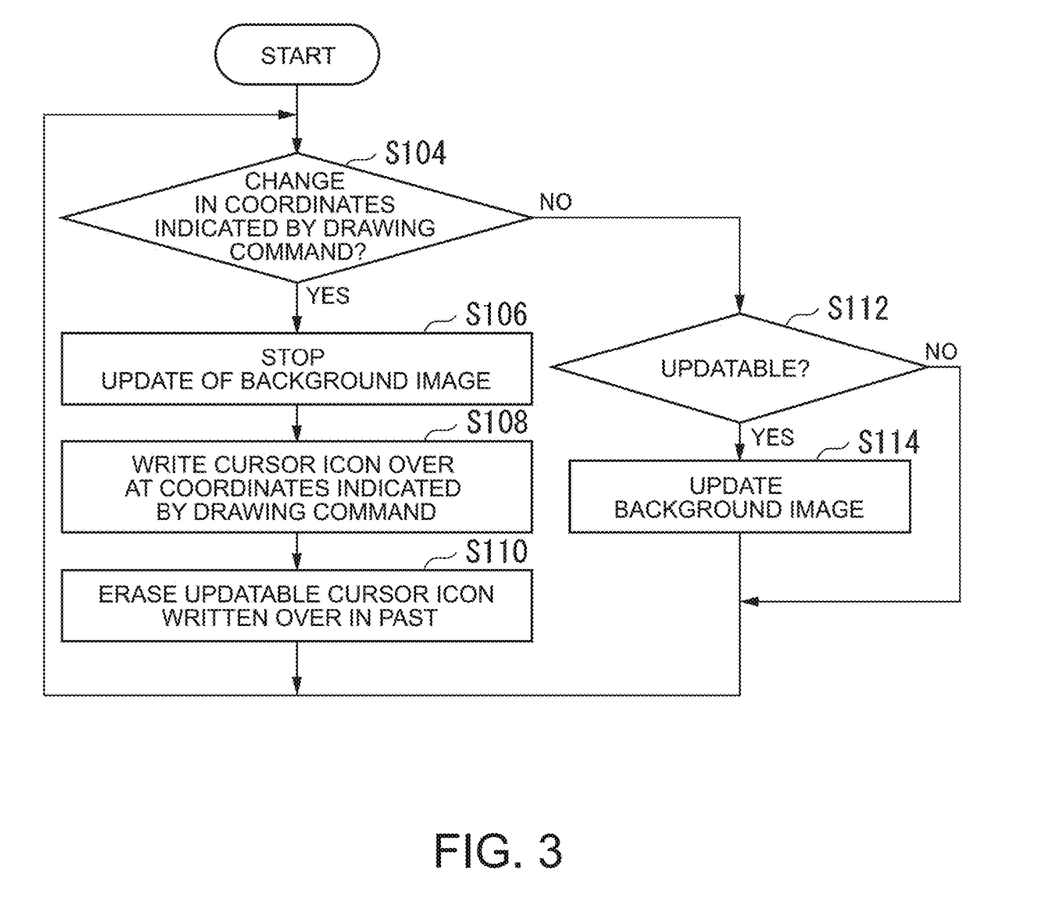
FIG. 3 is a flowchart illustrating an example of cursor display processing according to one or more embodiments.

The following describes an example of the cursor display processing according to one or more embodiments. FIG. 3 is a flowchart illustrating an example of cursor display processing according to one or more embodiments. FIG. 3 illustrates an example in which the host system 10 outputs display data indicating a background image at each frame cycle and a drawing command indicating the coordinates and a cursor at each sampling cycle to the display device 30. The background image buffer 362 of the timing controller 36 saves incoming display data and overwrites the original display data whenever the display data is input from the host system 10.

(Step S104) The update processing section 364 determines whether the coordinates indicated by the latest drawing command input from the host system 10 have changed from the coordinates indicated by the previous drawing command. When it is determined that the coordinates have changed (YES in step S104), the process proceeds to step S106. When it is determined that the coordinates have not changed (NO in step S104), the process proceeds to step S112.

(Step S106) The update processing section 364 stops the process of updating the background image written in the frame buffer 366 to the latest background image saved in the background image buffer 362. (Step S108) The update processing section 364 extracts the partial image, within the partial area whose reference point is the coordinates indicated by the latest drawing command, from the last-updated background image stored in the background image buffer 362. The update processing section 364 generates a cursor icon by superimposing the cursor transmitted by the drawing command on the extracted partial image. The update processing section 364 overlays (places) the cursor icon generated in the storage area corresponding to the partial area whose reference point is the coordinates indicated by the drawing command within the storage area of the frame buffer 366.

(Step S110) The update processing section 364 determines, as an updatable cursor icon, a cursor icon whose elapsed time from the placement time point is equal to or more than the update cycle, and written over the display area not including the display area of the cursor icon based on the latest coordinates, among the cursor icons that have been written over in the past. The update processing section 364 erases the updatable cursor icon. When erasing the updatable cursor icon, the update processing section 364 identifies the display area of the cursor icon and extracts a partial image within the identified display area from the latest background image stored in the background image buffer 362. The update processing section 364 writes the extracted partial image over the storage area of the frame buffer 366 corresponding to the identified display area. Thereafter, the control returns to the process of step S104.

(Step S112) The update processing section 364 determines whether the background image is updatable. The update processing section 364 is able to determine whether the background image is updatable by checking whether a cursor whose elapsed time from the placement time point is within the update cycle is present in the screen area. When the background image is determined to be updatable (YES in step S112), the process proceeds to step S114. When the background image is not determined to be updatable (NO in step S112), the process returns to step S104.

Figure 4:
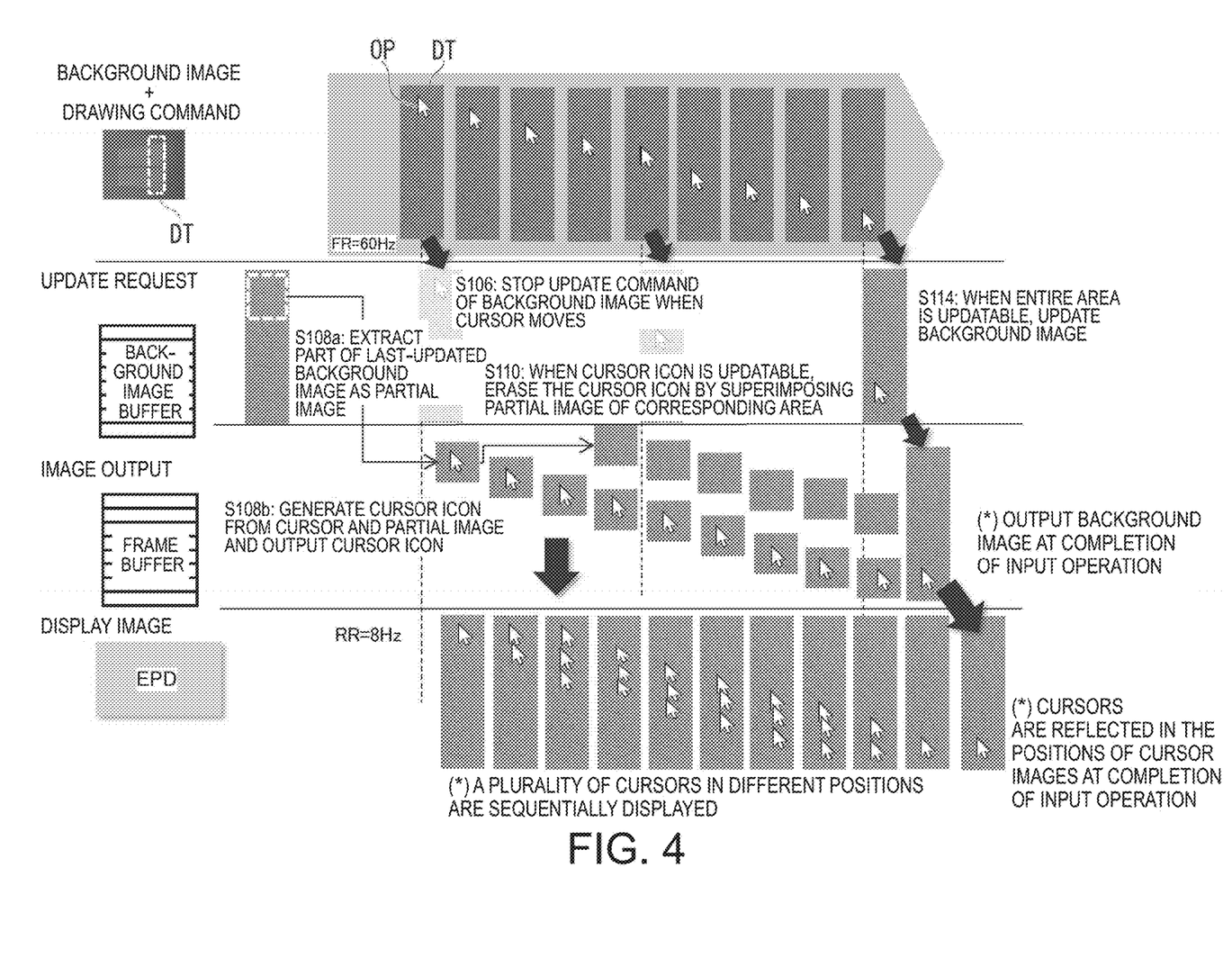
FIG. 4 is an explanatory diagram for describing an example of performing the cursor display processing according to one or more embodiments.

FIG. 4 is an explanatory diagram for describing an example of performing the cursor display processing according to one or more embodiments. FIG. 4 illustrates a case in which the processing of FIG. 3 is performed with an update cycle of 125 ms (corresponding to a refresh rate RR of 8 Hz) and a frame cycle of 16 ms (corresponding to a frame rate FR of 60 Hz). In this example, the frame cycle and the sampling cycle of the coordinates are equal to each other.

FIG. 4 illustrates a background image DT for each frame represented by the display data from the host system 10 and coordinates OP represented by the drawing command in the first row. In this example, the background image DT hardly changes with time, and the coordinates OP move from the top to the bottom of the screen area. The latest background image DT is stored at that time in the background image buffer 362 for each frame cycle.

In the second row, there is shown a background image used for updating the output image among the background images saved in the background image buffer 362. The background image is not updated in the first and second update cycles. This is because the movement of the coordinates indicated by the drawing command is detected and the update of the background image is stopped by the processes of steps S104 and S106. In the third update cycle, the background image is updated. This is because the cursor whose elapsed time from the placement time point is within the update cycle is not present in the screen area and it is determined that the entire area of the background image is able to be updated by the processes of steps S112 and S114.

In the third row, there are illustrated the elements of the output image to be written into the frame buffer 366. Note that the cursor icon, the partial image, and the background image are the elements of the output image. The cursor icon has coordinates different for each sampling cycle. The cursor icon is generated by the process of step S108. The update processing section 364 extracts a partial image within the partial area with the coordinates indicated by the drawing command as the reference point from the background image used for the last update (step S108a). The update processing section 364 superimposes the cursor transmitted by the drawing command on the extracted partial image (step S108b).

The update processing section 364 determines that the cursor icon having elapsed for a period equal to or more than the update cycle from the placement time point is updatable. The cursor icon determined to be updatable is erased by the process of step S110. That is, the partial image within the display area of the cursor icon determined to be updatable is extracted out of the last-updated background image from the background image buffer. The extracted partial image is written over the display area of the cursor icon. Then, when the cursor whose elapsed time from the placement time point is within the update cycle is no longer present in the screen area due to the completion of a series of input operations, the latest background image related to an update is written into the frame buffer 366. In addition, the cursor icon related to the coordinates indicated at that time is also written therein.

In the fourth row, there is illustrated a display image displayed by the EPD 38. The display image is represented based on the output image from the frame buffer 366. In the output image, cursors with different positions for respective sampling cycles are sequentially displayed as time passes. Note that the cursor icons remain displayed until the elapsed time from the start of the display reaches the update cycle. Therefore, the cursors placed at different coordinates for respective sampling cycles accumulate in the display image over time. Cursors whose elapsed time from the start of display is equal to or longer than the update cycle are erased by overwriting of the partial image. Therefore, the accumulation of cursors is suppressed. Then, when the input operation ends and the period during which the movement of the indicated coordinates stops continues for a period equal to or more than the update cycle, the background image is updated and the display of the cursor at that position is maintained.

Figure 5:
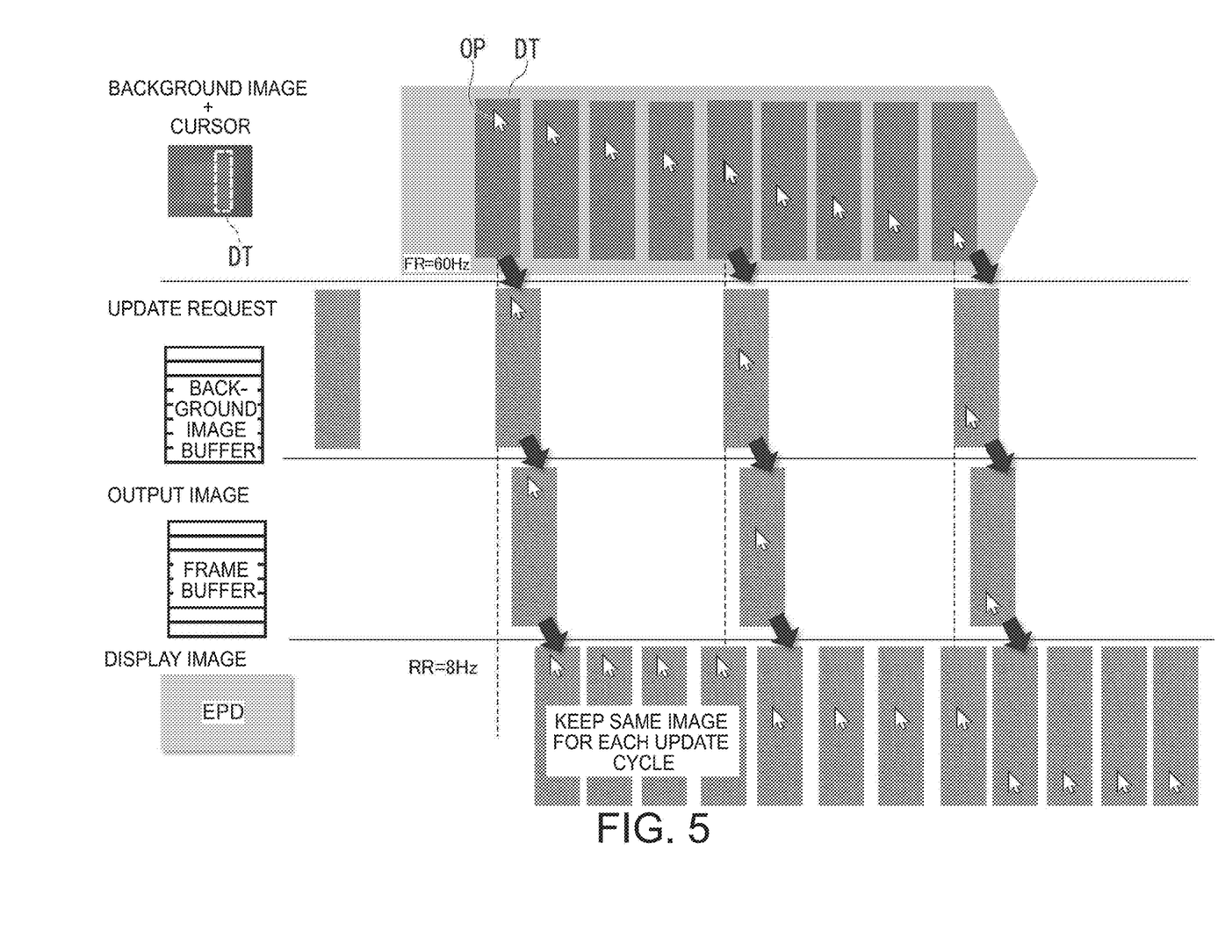
FIG. 5 is an explanatory diagram for describing a comparative example of the cursor display processing.

The following describes a comparative example of the cursor display processing. FIG. 5 is an explanatory diagram for describing the comparative example of the cursor display processing. In the comparative example, a frame cycle, a sampling cycle, and an update cycle are the same as those in FIG. 4. In the comparative example, however, the host system 10 outputs to the display device 30 an output image formed of cursors superimposed at the coordinates indicated by input operations on the background image at respective frame cycles. The background image buffer 362 of the display device 30 saves the output image input from the display device 30 for each update cycle. The output image newly saved in the background image buffer 362 is output directly to the EPD 38 via the frame buffer 366.

The EPD 38 displays a display image based on the output image transmitted from the frame buffer 366. Since the display image is maintained within each update cycle, the position of the cursor that appears in the display image is fixed. Therefore, the position of the cursor changes discretely for each update cycle. In contrast, since the cursor position changes with each sampling cycle in one or more embodiments, smoother cursor movement is represented.

In the above description, it is mainly assumed that the case in which the sampling cycle of the coordinates is equal to the frame cycle of the background image, but the present application is not limited thereto. In one or more embodiments, the sampling cycle of the coordinates may be different from the frame cycle of the background image. In addition, the update processing section 364 of the display device 30 may partially thin out the latest coordinate information input to itself and employ the thinned-out coordinate information for cursor display at regular cycles. By the thinning, the sampling cycle is adjusted to be substantially longer.

In one or more embodiments, however, the adjusted sampling cycle is set to be at least shorter than the update cycle. Generally, the shorter the sampling cycle is, the smoother the cursor movement is expressed, but the number of cursors displayed per update cycle increases. Therefore, as long as the smooth cursor movement is expressed, the longest possible sampling cycle (for example, 40 to 80 ms [corresponding to 12 to 24 Hz]) may be set.

The required smoothness of cursor movement may vary depending on the function of the program executed by the host system 10. For example, programs such as drawing apps and game apps, which are used in a situation where the coordinates indicated by the input device are continuously moved, have a high need for smooth movement of the cursor. For such programs, a short sampling cycle of coordinates is preferable. On the other hand, for programs that rarely move the coordinates indicated by the input device, such as text-based document creation apps, the need for smooth movement of the cursor is low. For such programs, a long sampling cycle of coordinates may be acceptable.

Therefore, the sampling cycle for each program may be set in advance in the cursor processing section 116a of the host system 10, and the display device 30 may be notified of the sampling cycle corresponding to the program to be executed by the OS processing section 114. The update processing section 364 of the display device 30 adopts the coordinate information input from the host system 10 for each sampling cycle given as a notice.

In the above description, there has been given an example that the update processing section 364 displays the cursor at the position indicated by the coordinates given as a notice by the host system 10, but the present application is not limited thereto. The update processing section 364 may predict the predicted coordinates after a predetermined elapsed time by using a predetermined prediction model on the basis of the coordinates indicated by the coordinate information of two (for example, the latest sample and the sample immediately before the latest sample) or more samples up to that time. As the prediction model, for example, a linear model may be used. The update processing section 364 displays the cursor at the position indicated by the predicted coordinates, instead of the coordinates indicated by the coordinate information. As the elapsed time, for example, a delay time between the detection of the coordinates and the display of the cursor is set to compensate for the delay until the cursor is displayed.

In the above description, it is mainly assumed that the background image is a moving image, but the present application is not limited thereto. The background image may be a still image. Even in the case where the background image is a still image, the update processing section 364 only needs to perform processing for the background image stored in the background image buffer 362 described above.

The cursor is not necessarily limited to an arrow. The cursor may be an image of any shape, pattern, color, or a combination thereof that is able to be clearly distinguished from other images. For example, the cursor may be a mark x, ■, or the like.

As described above, the information processing system S1 according to one or more embodiments has a host system 10 that samples the coordinates indicated by using an input device and acquires a background image and a controller (for example, a timing controller 36) that displays an output image based on the background image on a display medium. The host system notifies the controller of the sampled coordinates. The controller updates the background image with an update cycle longer than the sampling cycle of the coordinates, and outputs an output image, to the display medium, with the cursor placed at the sampled coordinates on the background image. The input device may be a mouse 40 and the display medium may be an EPD 38.

According to this configuration, the controller updates the background image acquired from the host system 10 with an update cycle longer than the sampling cycle of the coordinates, and displays the output image, on the display medium, with the cursor placed at the sampled coordinates on the background image. The display medium is able to display the cursor for each sampling cycle shorter than the update cycle of the background image. Since the cursor behavior is smoothly represented, the user is able to identify the cursor that represents the indicated coordinates more easily.

The host system 10 may output a drawing command indicating the sampled coordinates and the cursor to the controller, and the controller may place the cursor at the coordinates indicated by the drawing command.

According to this configuration, the cursor indicated by the drawing command is displayed at the coordinates indicated by the drawing command input from the host system 10. Therefore, even when the cursor is not set on the controller in advance, the cursor with the desired form indicated by the host system 10 is displayed.

When the display area of the cursor based on the latest coordinates does not include the display area of the cursor whose elapsed time from the placement time point is within the update cycle, the controller may place the cursor at the latest coordinates.

According to this configuration, the cursor is displayed at new coordinates at a distance where the display area does not overlap with the cursor already displayed. Since individual cursors are displayed sequentially so that their display areas do not overlap each other, the visibility of the cursors is not disturbed.

The controller may update the background image to be an element of the output image to the latest background image when there is no cursor whose elapsed time from the placement time point is within the update cycle of the display medium.

Therefore, the display of the cursor at the coordinates to be updated by sampling is given priority over the update of the background image. Since the user's input operations made by observing the cursor movement are not interfered with, the reduction in operability of the input device is suppressed.

The controller may erase a cursor placed in the display area that does not include the display area of the cursor based on the latest coordinates when the elapsed time from the placement time point of the cursor is more than the update cycle.

Therefore, the cursors that are not indicated at that time are erased while suppressing the generation of afterimages caused by erasing. Thus, the accumulation of useless cursors in the display image is able to be suppressed.

The controller may extract a partial image that has a size containing the cursor at the latest sampled coordinates from the last-updated background image, superimpose the cursor on the partial image to form a cursor icon, and place the cursor icon at the coordinates.

Therefore, the cursor icon superimposed on the partial image extracted from the latest background image is placed on that background image. Thus, the area to be processed may be used as the area of the cursor icon, while the area where the change is visible is able to be limited to a cursor area. By introducing a partial image that has a simpler shape than the cursor, the process related to writing the cursor is able to be simplified.

The host system 10 may predict the predicted coordinates after a predetermined elapsed time from the present on the basis of the coordinates of at least two samples, and the controller may place the cursor at the predicted coordinates on the background image.

This configuration compensates for the delay time between the detection of the coordinates and the display of the cursor, since the cursor is placed at the predicted coordinates after an elapsed time.

The embodiments of this disclosure have been described in detail with reference to the drawings. The specific configurations are not limited to those of the above embodiments, but also include designs and the like without departing from the gist of this disclosure. The respective configurations described in the above embodiments may be combined arbitrarily.

DESCRIPTION OF SYMBOLS

S1 information processing system
10 host system
12 processor
14 main memory
20 chipset
30 display device
36 timing controller
38 EPD
40 mouse
112 input processing section
114 OS processing section
116 output processing section
116a cursor processing section
116b display control section
362 background image buffer
364 update processing section
366 frame buffer

The invention claimed is:

1. An information processing system comprising:
a host system that samples coordinates indicated by using an input device to acquire a background image; and
a controller that displays an output image based on the background image on a display medium,
wherein the host system notifies the controller of the coordinates; and
wherein the controller updates the background image with an update cycle longer than a sampling cycle of the coordinates, and outputs the output image with a cursor placed at the coordinates on the background image to the display medium.

2. The information processing system according to claim 1, wherein:
the host system outputs a drawing command indicating the coordinates and the cursor to the controller; and
the controller places the cursor at the coordinates indicated by the drawing command.

3. The information processing system according to claim 1, wherein the controller places the cursor at latest coordinates when a display area of the cursor based on the latest coordinates does not include the display area of the cursor whose elapsed time from a placement time point is within the update cycle.

4. The information processing system according to claim 1, wherein the controller updates the background image to be the output image to a latest background image when there is no cursor whose elapsed time from a placement time point is within the update cycle.

5. The information processing system according to claim 4, wherein the controller erases the cursor placed in a display area that does not include the display area of the cursor based on the latest coordinates when the elapsed time of the cursor from the placement time point is equal to or longer than the update cycle.

6. The information processing system according to claim 1, wherein the controller extracts a partial image that has a size containing the cursor at the coordinates from a last-updated background image, superimposes the cursor on the partial image to form a cursor icon, and places the cursor icon at the coordinates.

7. The information processing system according to claim 1, wherein:
the host system predicts predicted coordinates after a predetermined elapsed time from the present based on at least two samples of coordinates; and
the controller places the cursor at the predicted coordinates on the background image.

8. The information processing system according to claim 1, wherein:
the input device is a mouse; and
the display medium is an electro-phoretic display.

9. A display device comprising a controller that displays an output image based on a background image on a display medium, wherein the controller updates the background image with an update cycle longer than a sampling cycle of coordinates and outputs the output image with a cursor placed at the coordinates to the display medium.

10. A control method in an information processing system having a host system and a controller,
wherein the host system samples coordinates indicated by using an input device, notifies the controller of the coordinates, and acquires a background image; and
wherein the controller updates the background image with an update cycle longer than a sampling cycle of the coordinates, and outputs an output image with a cursor placed at the coordinates to a display medium.

* * * * *